United States Patent
Choji

[11] Patent Number: 5,381,313
[45] Date of Patent: Jan. 10, 1995

[54] HEADLAMP WITH DISPLACEMENT GAUGE

[75] Inventor: Masataka Choji, Shizuoka, Japan

[73] Assignee: Koito Manufacturing Co., Ltd., Tokyo, Japan

[21] Appl. No.: 67,799

[22] Filed: May 27, 1993

[30] Foreign Application Priority Data

Jul. 7, 1992 [JP] Japan .............. 4-047304[U]

[51] Int. Cl.$^6$ ............................................. F21M 3/22
[52] U.S. Cl. .................... 362/66; 362/269; 362/275; 362/287; 362/419
[58] Field of Search ............... 362/66, 61, 275, 287, 362/289, 273, 421

[56] References Cited

U.S. PATENT DOCUMENTS

| | | | |
|---|---|---|---|
| 4,922,387 | 5/1990 | Ryder et al. | 362/80 |
| 5,032,964 | 7/1991 | Endo et al. | 362/66 |
| 5,063,480 | 11/1991 | McMahan et al. | 362/66 |
| 5,067,052 | 11/1991 | Suzuki et al. | 362/61 |
| 5,077,642 | 12/1991 | Lisak | 362/66 |
| 5,091,829 | 2/1992 | Hendrischk et al. | |
| 5,138,532 | 8/1992 | Shirai et al. | |
| 5,209,558 | 5/1993 | Suzuki et al. | 362/66 |

FOREIGN PATENT DOCUMENTS 63-27164 7/1988 Japan .

Primary Examiner—James C. Yeung
Attorney, Agent, or Firm—Sughrue, Mion, Zinn, Macpeak & Seas

[57] ABSTRACT

Art automobile headlamp having a displacement gauge that facilitates the rotation of a zeroing adjustment screw. The displacement gauge is mounted between a lamp body and a reflector, which is supported rotatably by aiming mechanisms in the lamp body and is employed to measure the amount of rightward or leftward displacement of the light beam axis of the reflector. A zeroing adjustment screw for the displacement gauge passes through and extends rearward beyond the lamp body. A crown gear, employed as a screwdriver engaging fitting to rotate the zeroing adjustment screw, is fitted over the end of the zeroing adjustment screw at the rear of the lamp body. With this arrangement, a screwdriver can be inserted from above the lamp body to engage the crown gear and to rotate the zeroing adjustment screw. In an alternate embodiment, a drive shaft is provided having a bevel gear at its lower end engaging the crown gear and a screwdriver-engaging fitting at its upper end.

2 Claims, 4 Drawing Sheets

HEADLAMP WITH DISPLACEMENT GAUGE

BACKGROUND OF THE INVENTION

The present invention relates to an automobile headlamp that has a gauge for determining the amount of rightward or leftward displacement of the light beam axis of the headlamp. More particularly, the present invention pertains to an automobile headlamp having a displacement gauge that measures the amount of rightward or leftward rotational movements of an independently adjustable reflector, or that measures the amount of such movements of a headlamp that has an integrated unit of reflector and a lamp body.

An example of conventional headlamp of the same general type to which the invention pertains is described in Japanese Unexamined Publication No. Hei 3-155001. As shown in FIG. 6 of the present application, a displacement gauge c is mounted between an enclosing lamp body a, which is a headlamp component, and a reflector b, another headlamp component, that is supported rotatably along horizontal and vertical axes by an aiming mechanism. The design of the displacement gauge c includes a fixed holder 1, which is secured to the lamp body a, a movable holder 2, which is fitted into and travels forward and backward within the fixed holder 1, a slide pin 3, which rides within the movable holder 2 and is projected forward by a spring, and a zeroing adjustment screw 4, which extends through the end of the fixed holder 1 at the lamp body a and is threaded into the movable holder 2 from the rear. As the slide pin 3 is held flexibly in contact with the reflector b and slides within the movable holder 2 as the reflector b is rotated around the vertical axis, the relative positions of the scale lines 5 that are inscribed on the slide pin 3 and the movable holder 2 are changed. Thus, when zero adjustment is performed by rotating the zeroing adjustment screw 4, the amount of rightward or leftward displacement of the light beam axis L (the shifting of the light beam axis L), which is focused by the reflector b, can easily be determined by inspecting the relative scale lines 5 on the slide pin 3 and the movable holder 2.

In the conventional arrangement, to drive the zeroing adjustment screw 4, a screwdriver 6 engages a screwdriver engaging fitting 4a, which is mounted on the segment of the zeroing adjustment screw 4 that protrudes rearward beyond the lamp body a, as shown in FIG. 6. Since the zeroing adjustment screw 4 can be driven only from the rear of the lamp body a, the zeroing adjustment is difficult to carry out. Moreover, as little space is available, particularly at the rear of a headlamp that is mounted on an automobile, and inserting the screwdriver 6 is difficult, carrying out the zero adjustment is very complicated.

SUMMARY OF THE INVENTION

To overcome the above described shortcomings, it is an object of the present invention to provide an automobile headlamp with a displacement gauge whose zeroing adjustment screw is easily rotated.

To achieve the above and other objects, the present invention provides an automobile headlamp that has a displacement gauge, the displacement gauge being mounted between a fixed member and a movable member pivotally supported on the fixed member by an aiming mechanism and being employed to measure an amount of rightward or leftward movement of a light beam axis of the movable member. The displacement gauge has a zeroing adjustment screw which extends rearward beyond the fixed member, and has, for rotating the zeroing adjustment screw, a screwdriver engaging fitting provided at the rear of the fixed member. In accordance with the invention, a gear is fitted over and fixed to a rearward extending segment of the zeroing adjustment screw, and is engaged by a screwdriver inserted from above the fixed member.

The displacement gauge may be mounted between the fixed member and the movable member, and is employed to measure the amount of rightward or leftward movement of the light beam axis of the movable member. The zeroing adjustment screw extends rearward beyond the fixed member. For rotation of the zeroing adjustment screw, the screwdriver engaging fitting may be mounted on the upper end of a drive shaft that extends vertically along the rear of the fixed member and may have at its terminal end a driving gear which engages a coupling gear fitted over and fixed to the rearward extending segment of the zeroing adjustment screw, the screwdriver engaging fitting being designed to be engaged by a screwdriver inserted from above the fixed member.

For a headlamp that has an independently adjustable reflector, a lamp body is employed as the fixed member and a reflector is employed as the movable member. For a unitarily adjustable type headlamp, the lamp housing is the fixed member and a lamp body-reflector unit is the movable member.

A screwdriver that is inserted from above the headlamp engages the screwdriver engaging fitting, provided at the rear of the headlamp, that rotates the zeroing adjustment screw, and the rotation of the screwdriver controls the movement of the zeroing adjustment screw.

DESCRIPTION OF THE PREFERRED EMBODIMENTS

Preferred embodiments of the present invention will now be described while referring to the accompanying drawings.

Figure 1:
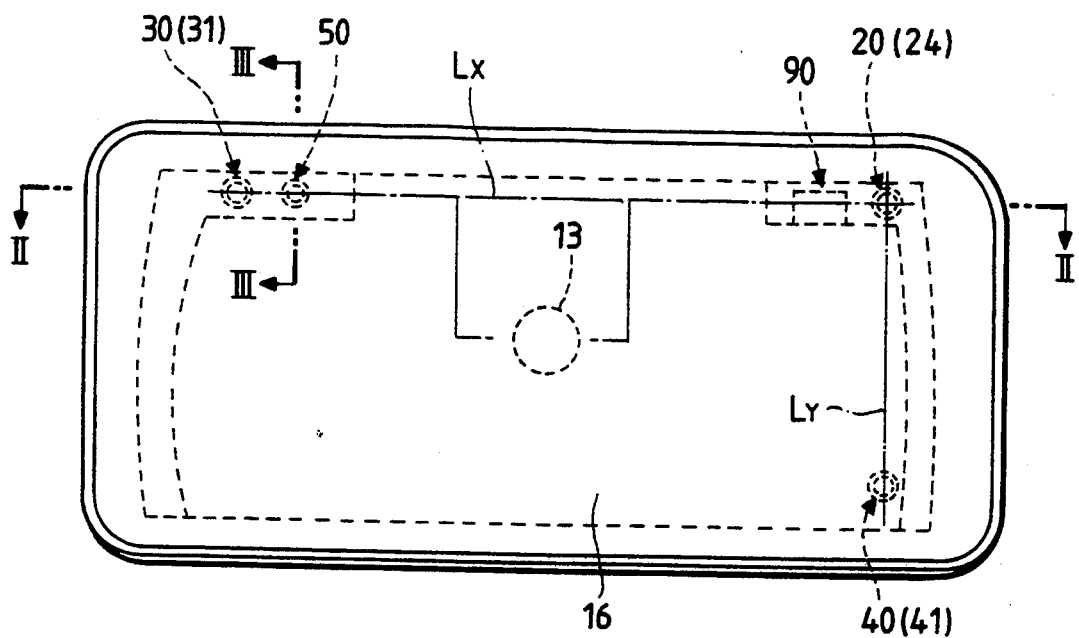
FIG. 1 is a front view of an automobile headlamp having a displacement gauge according to one embodiment of the present invention.
Figure 2:
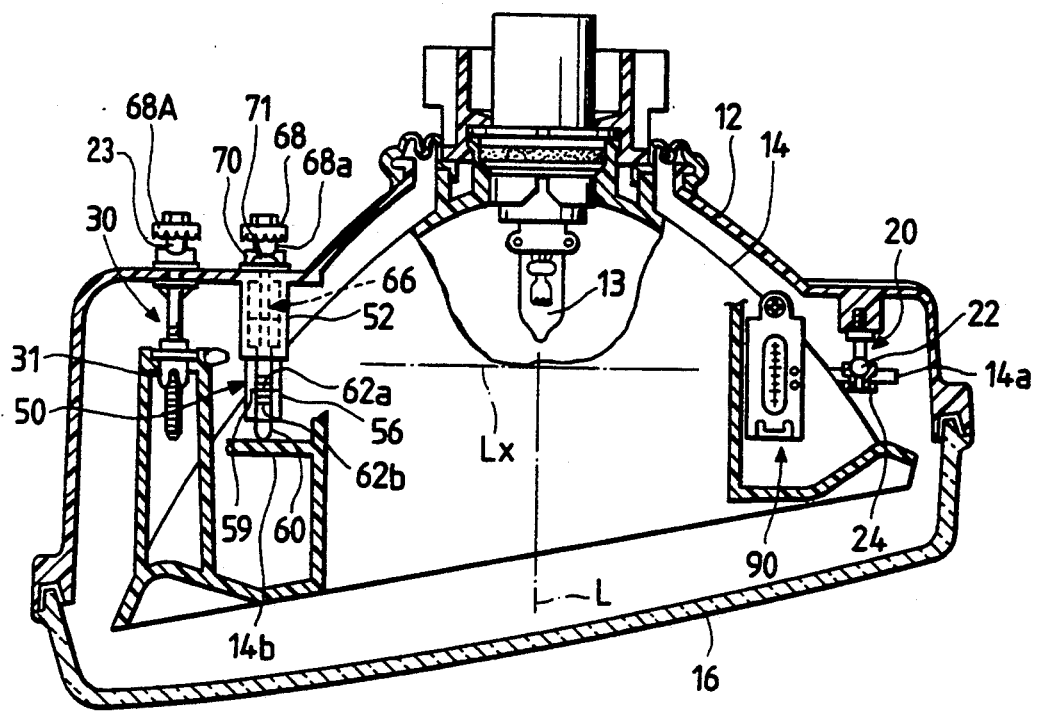
FIG. 2 is a horizontal cross-sectional view of the automobile headlamp taken along the line II—II shown in FIG. 1.
Figure 3:
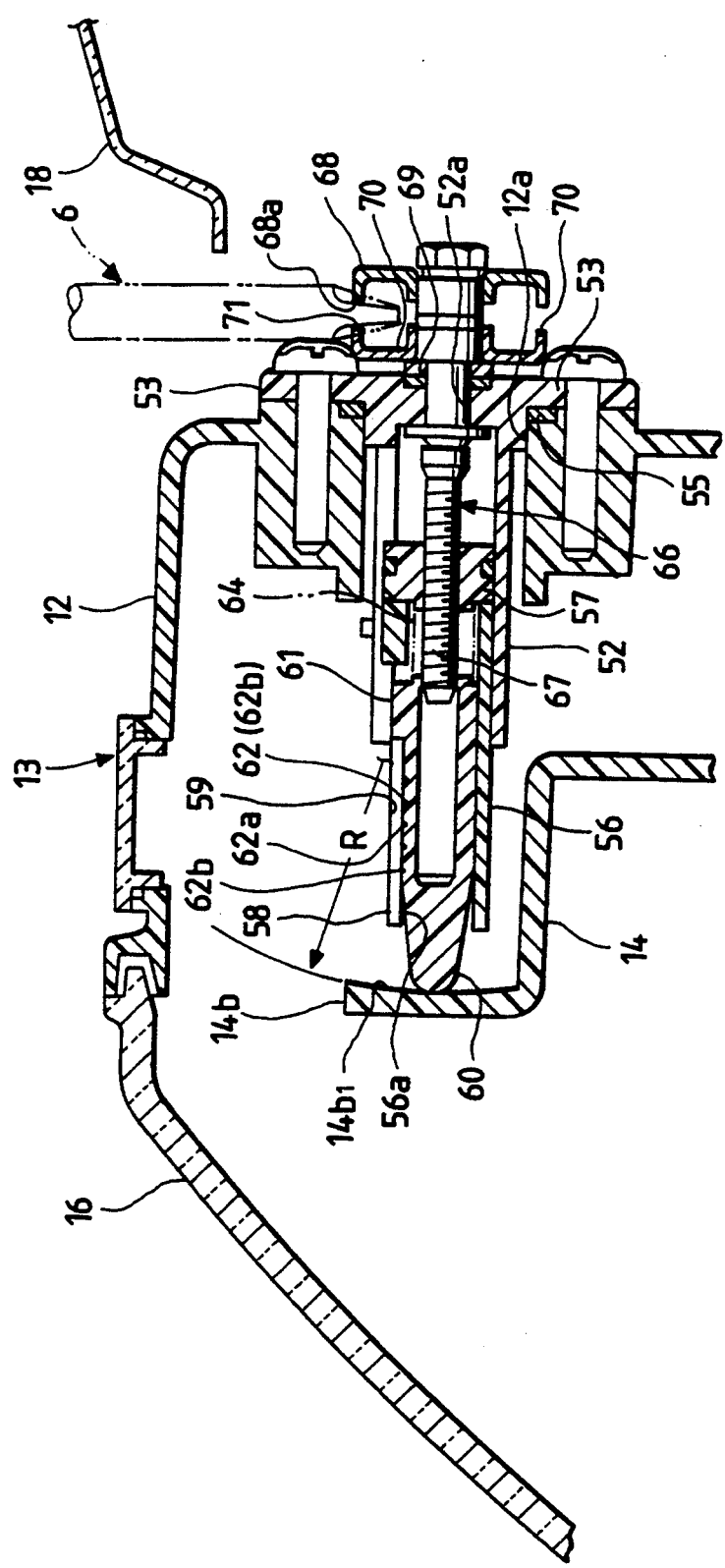
FIG. 3 shows an enlarged vertical cross-sectional view of the displacement gauge of the automobile headlamp and its periphery taken along the line III—III shown in FIG. 1.

FIGS. 1 through 3 each illustrate an automobile headlamp of a type having an independently adjustable reflector and a displacement gauge and which is constructed according to a preferred embodiment of the present invention. FIG. 1 is a front view of the headlamp, FIG. 2 shows a horizontal cross section of the headlamp (a cross-sectional view taken along the line II—II in FIG. 1), and FIG. 3 shows a vertical cross section of the displacement gauge of the headlamp and its periphery (an enlarged cross-sectional view taken along the line III—III shown in FIG. 1).

Reference numeral 12 denotes an enclosing lamp body. Within the lamp body 12 is disposed a parabolic reflector 14, wherein a bulb 13, which is the light source of the headlamp, is mounted. Across the front opening of the lamp body 12 is fitted a front lens 16.

As shown in FIGS. 1 and 2, the reflector 14 is supported within the lamp body 12 by a ball joint 20, a horizontal aiming screw 30, and a vertical aiming screw 40. Since a ball 22 of the ball joint 20 is secured to the lamp body 12 and a ball socket 24 fitted over the ball 22 is secured to a bracket 14a mounted on the reverse side of the reflector 14, the reflector 14 can swivel at the ball joint 20. The aiming screws 30 and 40 pass through the lamp body 12 forward and backward, and are supported at the lamp body 12. The forward ends of the aiming screws 30 and 40 are screwed respectively into nuts 31 and 41 on the sides of the reflector An engaging fitting 23 for a tool (e.g., screwdriver) is mounted on the segment of the shaft of the aiming screw 30 that protrudes from the rear of the lamp body 12. A similar fitting is provided for the aiming screw 40. In response to the rotation of the aiming screws 30 and 40 by tools, the nuts 31 and 41 are made to travel bidirectionally along the shafts of the screws 30 and 40, whereby the position of the reflector 14 is altered.

More specifically, the support point of the horizontal aiming screw 30 for the reflector 14 (engaging portion of the aiming screw 30 and the nut 31) is located on the horizontal axis $L_x$, which is perpendicular to the light beam axis L of the headlamp (see FIG. 2) on which the ball joint 20 is positioned. The support point of the vertical aiming screw 40 for the reflector 14 (the engaging portion of the aiming screw 40 and the nut 41) is located on the vertical axis $L_y$, which is perpendicular to the light beam axis L of the headlamp, on which the ball joint 20 is located. As the aiming screw 30 is rotated, the nut 31 reciprocably travels along the screw 30. The reflector 14 is then rotated around the vertical axis $L_y$. In this way, the horizontal displacement of the reflector 14, which is a movable member, relative to the lamp body 12, i.e., the horizontal light beam angle of the headlamp, can be adjusted. When the aiming screw 40 is rotated, the nut 41 reciprocably travels along the screw 40. The reflector 14 is displaced around the horizontal axis $L_x$ perpendicular to the vertical axis $L_y$. Therefore, the vertical inclination of the reflector 14 relative to the lamp body 12, i.e., the vertical light beam angle of the headlamp, can be adjusted. As described above, using the two aiming screws 30 and 40 the displacement attitude of the reflector 14, i.e., the light beam angle of the headlamp, can be controlled.

Reference numeral 50 denotes a displacement gauge that is mounted in the horizontal plane that includes the horizontal axis $L_x$ and is employed to measure the amount of horizontal displacement of the reflector 14, i.e., the horizontal displacement of the light beam of the headlamp.

FIG. 3 illustrates the displacement gauge 50 in detail. The displacement gauge 50 includes a cylindrical fixed holder 52, which penetrates and is fixed to the rear wall of the lamp body 12, a cylindrical movable holder 56, which is inserted into and travels forward and backward within the fixed holder 52, a slide pin 60, which is inserted into and travels within the movable holder 56, a compressed coil spring 64, which is retained in the movable holder 56 and drives the slide pin 60 forward through a front opening 56a of the movable holder 56, and a zeroing adjustment screw 66, which passes through and is supported at its rear by the fixed holder 52 and which is threaded into and retained within the movable holder 56 by its external thread 67.

The cylindrical fixed holder 52 has a pipe-cap shaped cross section, a slot along its top surface, and a flanged portion 53 that extends above and below the opening 12a, formed in the rear wall of the lamp body 12, into which the fixed holder 52 is fitted. Reference numeral 55 denotes packing that seals a gap between the fixed holder 52 and the opening 12a of the lamp body 12a.

The movable holder 56 is cylindrical with a rectangular vertical cross section, and its external shape corresponds to the internal shape of the fixed holder 52. A nut member 57, into which is screwed the screw 66 that has an external thread 67, is fitted over the rear opening of the movable holder 56 by convex-concave engagement. As the screw 66 rotates, the movable holder 56 moves forward and backward within the fixed holder 52.

A protruding portion 61 of the slide pin 60 fits into a ,Longitudinal slot 58, which is formed in the upper wall of the movable holder 56, and the slide pin 60 is thus enabled to slide forward and backward within the movable holder 56. The compressed coil spring 64 is located between the slide pin 60 and the nut member 57 and drives the slide pin 60 forward so that its forward face contacts a vertical wall 14b of the reflector 14. Horizontal movement of the reflector 14 (displacement around the vertical axis $L_y$), therefore, causes the slide pin 60 to slide within the movable holder 56. Scale lines 62 are inscribed on the portion of the slide pin 60 that is exposed by the longitudinal slot 58. A reference line 59 (an index mark for the scale lines 62) is inscribed on the upper surface of the movable holder 56 at the lip of the longitudinal slot 58. When the zero point of the scale lines 62 is aligned with the reference line 59 (zero adjustment is performed), the horizontal displacement of the reflector 14 is indicated by the scale lines 62. The scale lines 62 and the reference line 59 are ink-inscribed and recessed. A center scale line 62a (the zero point) is red and the other scale lines 62b are blue, and the reference line 59 is black. This color variation facilitates reading the scale through an observation window 43, which is fitted in an opening in the lamp body 12.

Reference numeral 69 denotes a snap ring that retains the zeroing adjustment screw 66 in a through hole 52a in the fixed holder 52. A crown gear 68, which forms part of a screwdriver engaging fitting, is mounted on the end of the shaft segment of the screw 66 that extends beyond the rear of the fixed holder 52. Teeth 68a of the crown gear 68 face the lamp body 12. A screwdriver guide 70, which positions the screwdriver 6, is secured, opposite the crown gear 68, to the external surface of the screw support portion of the fixed holder 52. An arched notch 71 formed in the screwdriver guide 70 positions the head of the screwdriver 6. This notch 71 prevents disengagement of the screwdriver 6 from the crown gear 68 when the zeroing adjustment screw 66 is rotated.

To perform zero adjustment, as shown in FIG. 3, the screwdriver 6 is inserted from the above the lamp body 12 to engage the crown gear 68. Then, as the screwdriver 6 is rotated, the zeroing adjustment screw 66 is turned to cause the movable holder 56 to reciprocate within the fixed holder 52. Since the compressed coil spring 64 impels the slide pin 60 forward and holds its forward end in contact with the vertical wall 14a of the reflector 14, the movable holder 56 slides forward and backward along the slide pin 60, and its movement alters the relative position of the reference line 59, inscribed on the movable holder 56, to the scale lines 62, inscribed on the slide pin 60. Therefore, it is easy to carry out zero adjustment by rotating the zeroing adjustment screw 66 and aligning the reference line 59 with the center scale line 62a (the zero point).

Reference numeral 18 in FIG. 3 denotes part of an automobile body. Since the screwdriver 6 can be inserted into the gap between the headlamp and the automobile body, even though that gap is narrow, a particularly effective way is provided to zero the displacement gauge 50 of the headlamp.

The displacement of the reflector 14 can be adjusted along the horizontal axis $L_x$ by the rotation of the aiming screw 40. As a pin end contact surface $14b_1$ of the vertical wall 14b of the reflector 14, however, moves in an arc with a diameter R at the horizontal axis $L_x$, depending on the magnitude of the vertical inclination of the reflector 14 (inclination around the horizontal axis $L_x$), the position of the slide pin 60 may or may not change, i.e., the relative position of the reference line 59 to the scale lines 62 of the displacement gauge 50 may or may not change.

In the same arrangement as for the rearward protruding segment of the zeroing adjustment screw 66, a crown gear 68a (see FIG. 2) is fitted at the rear of the segment of the shaft of the aiming screw 30 that protrudes rearward beyond the lamp body 12. The aiming screw 30 can therefore be rotated by the screwdriver 6 from above the lamp body 12.

Reference numeral 90 is an inclination gauge (a bubble tube leveling device) which is provided on the upper wall of the lamp body 12, i.e., on the side opposite to the installation side for the displacement gauge 50. The inclination gauge 90 is provided for measuring the vertical inclination of the light beam axis L of the reflector 14 (i.e., the amount of rotation around the horizontal axis $L_x$ of the reflector 14).

Figure 4:
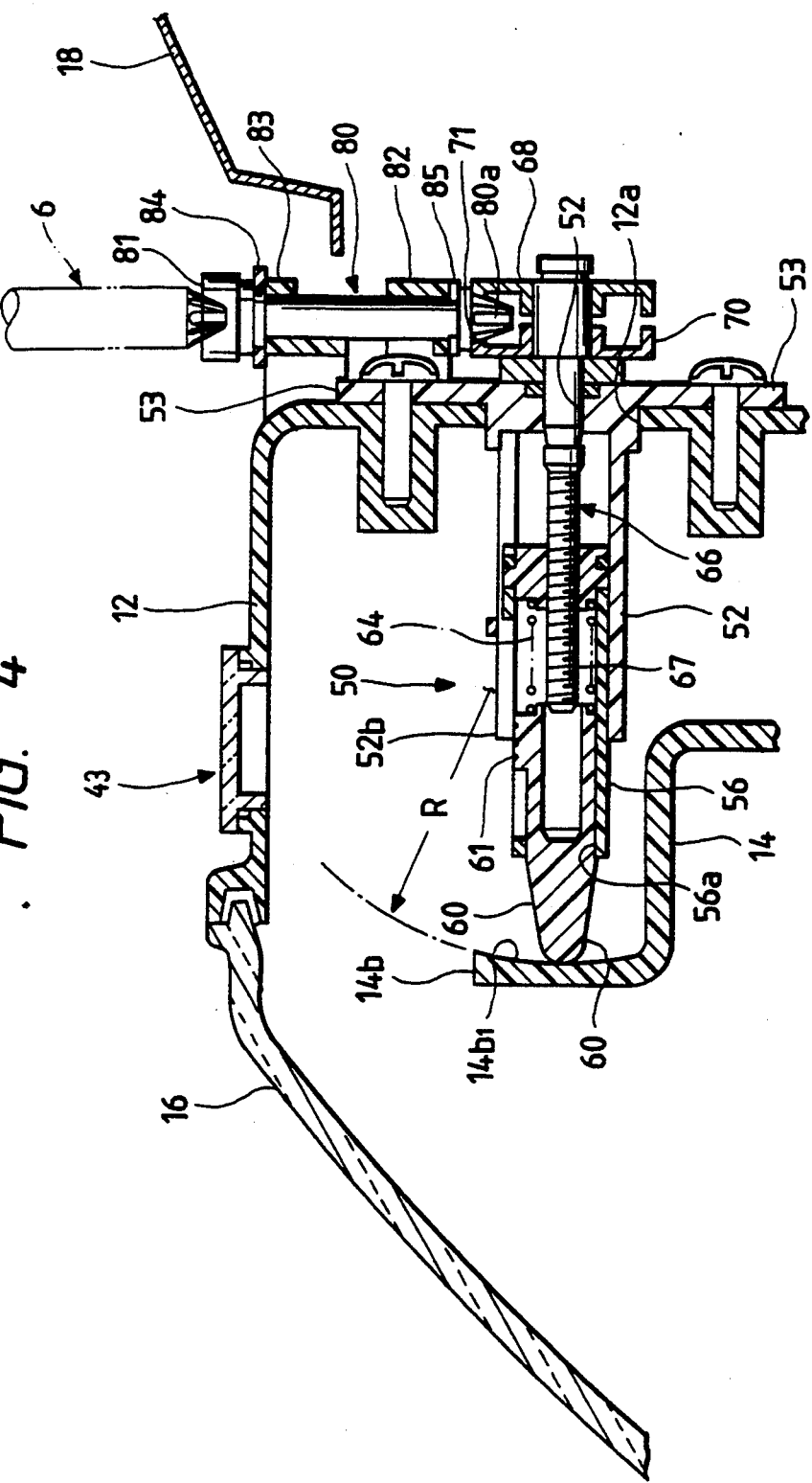
FIG. 4 is a cross-sectional view of essential portions of an automobile headlamp with a displacement gauge and its periphery according to another embodiment of the present invention.

FIG. 4 illustrates a cross section of essential peripheral components of a displacement gauge according to the second embodiment of the present invention.

In this embodiment, the scale lines 62 are inscribed on the forward extending portion 61 of the slide pin 60, and the front edge 52b of the fixed holder 52 serves as a reference line for the scale lines 62. A drive shaft 80, which has a bevel-toothed gear 80a that serves as a driving gear and that engages the teeth 68a of the crown gear 68 fitted on the segment of the zeroing adjustment screw 66 which protrudes rearward beyond the lamp body 12, extends upward along the external back wall of the lamp body 12. Reference numerals 82 and 83 indicate brackets that support the drive shaft 80, reference number 84 is a washer, and reference number 85 is an E ring.

A recess 81, into which the head of the screwdriver 6 is inserted, is formed at the top of the drive shaft 80. The drive shaft 80 is rotated by inserting the screwdriver 6 into the recess 81 from above and turning it. The rotation of the drive shaft 80 is transmitted to the zeroing adjustment screw 66 by the bevel toothed gear 80a, a drive gear, and the crown gear 68 when zeroing adjustment is performed.

As the other components correspond to components in the first embodiment, and as their functions are the same, the same reference numbers are used as for identical components in the first embodiment, and a further explanation thereof is omitted.

Since in this embodiment the screwdriver engagement recess 81, which is employed to rotate the zeroing adjustment screw 66, is positioned above and behind the lamp body 12, zero adjustment for this embodiment is easier to perform than in the first embodiment.

Figure 5:
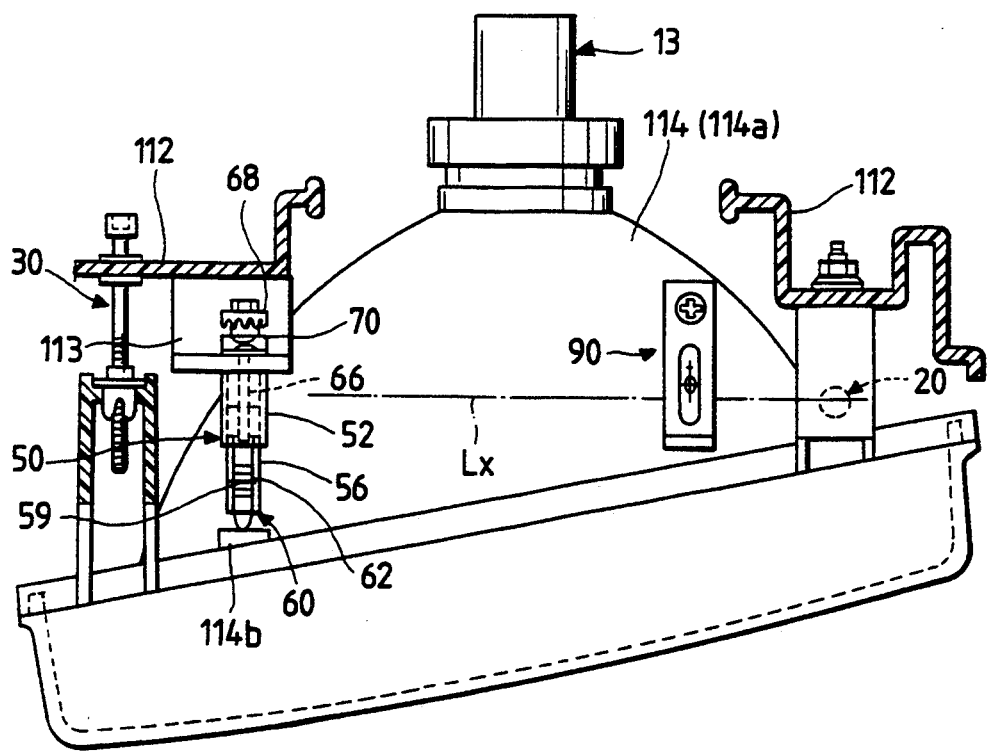
FIG. 5 is a horizontal cross-sectional view of an automobile headlamp with a displacement gauge according to a further embodiment of the present invention.
Figure 6:
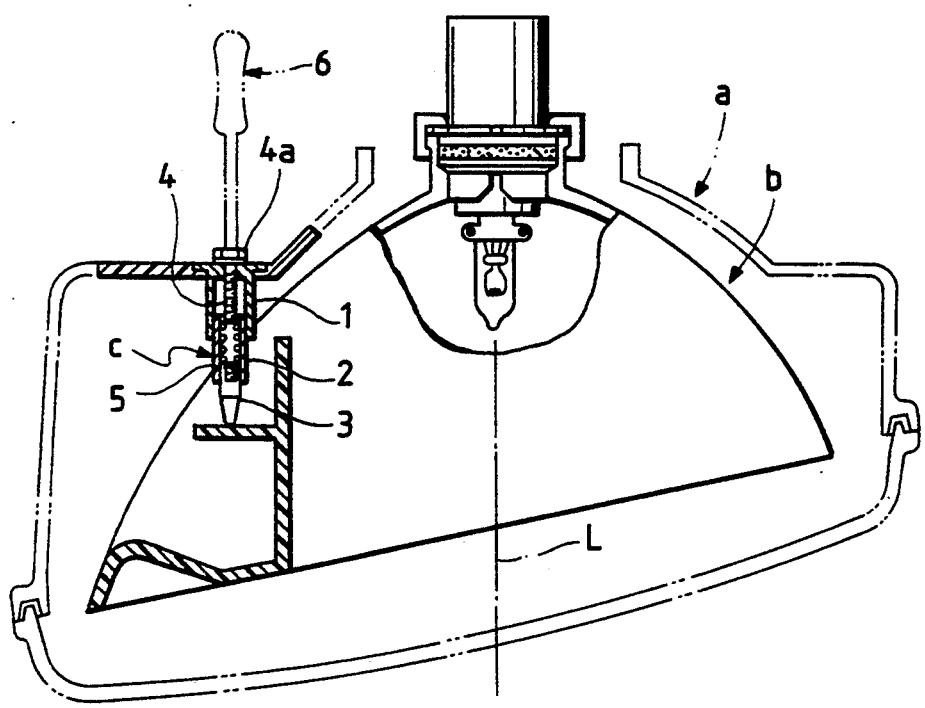
FIG. 6 shows a cross-sectional view of a conventional automobile headlamp that has a displacement gauge.

The above two embodiments relate to a headlamp with an independently adjustable reflector, but the present invention can also be employed for the unitarily adjustable headlamp depicted in FIG. 5.

In the horizontal plane including the horizontal axis $L_x$ for an upper wall 114a of an integrated unit 114, which includes a lamp body and a fixed reflector, are provided the displacement gauge 50, which is used to measure the right and left displacements of the lamp body-reflector unit 114, and the inclination gauge 90, namely, a bubble tube leveling device used to measure the vertical inclination of the lamp body-reflector unit 114.

The displacement gauge 50 is secured by a screw to a bracket 113, which is attached to a lamp housing 112, and extends forward. The forward end of the slide pin 60 is driven forward and held in contact with a vertical wall 114b positioned on the side of the lamp body-reflector unit 114.

As the other components correspond to components in the first and second embodiments, the same reference numbers are applied and a further explanation thereof is omitted.

As is apparent from the above descriptions, since insertion of a screwdriver from above a headlamp into a screwdriver engaging fitting located on the external rear wall of the headlamp and rotation of the zeroing adjustment screw can be accomplished while facing the front of the headlamp, zero adjustment is easy to perform for an automobile headlamp according to the present invention. Performing zero adjustment is particularly easy for a headlamp installed on an automobile. A screwdriver can be inserted from above into a small space behind the external rear wall of the headlamp to engage a screwdriver engaging fitting and to rotate a zeroing adjustment screw.

What is claimed is:

1. An automobile headlamp comprising:
   a fixed member;
   a movable member including a light source and a reflector having an optical light beam axis;
   an aiming mechanism for pivotally supporting said movable member on said fixed member;
   a displacement gauge, said displacement gauge being mounted between said fixed member and said movable member for measuring an amount of rightward or leftward movement of said light beam axis of said movable member, said displacement gauge comprising a wherein horizontal movement of said movable member causes said slide pin to move within said movable holder;
   a gear fitted over a rearward extending segment of said zeroing adjustment screw at an external rear wall of said fixed member, said gear being engagable by a screwdriver inserted from above said fixed member, said gear comprising a crown gear having teeth facing said fixed member;

a screwdriver guide for guiding a screwdriver to said crown gear, said screwdriver guide being secured to an external surface of said fixed member, said screwdriver guide having an arched notch for positioning a head of said screwdriver and preventing disengagement of said screwdriver from said crown gear.

2. An automobile headlamp comprising:

a fixed member;

a movable member including a light source and a reflector having an optical light beam axis;

an aiming mechanism for pivotally supporting said movable member on said fixed member;

a displacement gauge, said displacement gauge being mounted between said fixed member and said movable member for measuring an amount of rightward or leftward movement of said light beam axis of said movable member, said displacement gauge comprising a cylindrical fixed holder penetrating an aperture in and fixed to a rear wall of said fixed member, said cylindrical fixed holder having a pipe-shaped cross section and a slot along a top surface thereof and comprising a flanged portion extending above and below said aperture in said rear wall of said fixed member, a cylindrical movable holder inserted in and movable forward and backward within said fixed holder, said cylindrical movable holder having a generally cylindrical configuration and a rectangular vertical cross section, slide pin inserted into and movable within said movable holder, said slide pin having a protruding portion slidably received in said slot of said fixed holder, scale lines being inscribed on a portion of said slide pin exposed by said slot and a reference line being inscribed on an upper surface of said movable holder adjacent said slot, a compressed coil spring retained in said movable holder and urging said slide pin forward through a front opening in said movable holder, said zeroing adjustment screw passing through and being supported by said fixed holder and being screwed into and retained within said movable holder, a zeroing adjustment screw extending rearward beyond said fixed member, and a nut member threadedly joined to said adjustment screw and fitted to a rear opening of said movable holder, said coil spring being disposed between said slide pin and said nut member so as to drive said slide pin forward so that a forward face of said slide pin contacts a vertical wall of said movable member cylindrical fixed holder penetrating an aperture in and fixed to a 7 rear wall of said fixed member, said cylindrical fixed holder having a pipe-shaped cross section and a slot along a top surface thereof and comprising a flanged portion extending above and below said aperture in said rear wall of said fixed member, a cylindrical movable holder inserted into and movable forward and backward within said fixed holder, said cylindrical movable holder having a generally cylindrical configuration and a rectangular vertical cross section, a slide pin inserted in and movable within said movable holder, said slide pin having a protruding portion slidably received in said slot of said fixed holder, scale lines being inscribed on a portion of said slide pin exposed by said slot and a reference line being inscribed on an upper surface of said movable holder adjacent said slot, a compressed coil spring retained in said movable holder and urging said slide pin forward through a front opening in said movable holder, said zeroing adjustment screw passing through and being supported by said fixed holder and being screwed into and retained within said movable holder, a zeroing adjustment screw extending rearward beyond said fixed member, a nut member threadedly joined to said adjustment screw and fitted to a rear opening of said movable holder, said coil spring being disposed between said slide pin and said nut member so as to drive said slide pin forward so that a forward face of said slide pin contacts a vertical wall of said movable member wherein horizontal movement of said movable member causes said slide pin to move within said movable holder;

a crown gear fitted over a rearward extending segment of said zeroing adjustment screw at an external rear wall of said fixed member;

a drive shaft extending upward from said first gear means, said drive shaft having a screwdriver-engaging recess at an upper end thereof;

a bevel gear fixed to a lower end of said drive shaft, said bevel gear engaging said crown gear; and a pair of brackets for rotatably supporting said drive shaft, said brackets being fixed to said rear wall of said fixed member.

* * * * *